United States Patent
Cho et al.

(10) Patent No.: US 10,497,951 B2
(45) Date of Patent: Dec. 3, 2019

(54) APPARATUS AND METHOD OF SUPPLYING FUEL CELL STACK MATERIAL

(71) Applicants: Hyundai Motor Company, Seoul (KR); Kia Motors Corporation, Seoul (KR)

(72) Inventors: Sang Hyun Cho, Gyeonggi-do (KR); Nam Gu Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 301 days.

(21) Appl. No.: 15/206,793

(22) Filed: Jul. 11, 2016

(65) Prior Publication Data
US 2017/0162887 A1 Jun. 8, 2017

(30) Foreign Application Priority Data
Dec. 7, 2015 (KR) .......... 10-2015-0173430

(51) Int. Cl.
*B65H 3/08* (2006.01)
*H01M 8/04082* (2016.01)

(52) U.S. Cl.
CPC ................ *H01M 8/04208* (2013.01)

(58) Field of Classification Search
CPC ........... H01M 8/04208; H01M 8/2404; H01M 8/023; B65H 3/0816
USPC .................... 414/796.7, 796.9, 797
See application file for complete search history.

(56) References Cited

U.S. PATENT DOCUMENTS

| | | | | |
|---|---|---|---|---|
| 4,886,261 A * | 12/1989 | Jeschke | ..................... | B65H 9/04 271/11 |
| 5,556,252 A * | 9/1996 | Kuster | ..................... | B65H 1/14 271/155 |
| 6,584,991 B1 * | 7/2003 | Ries | ........................ | A23N 12/02 134/122 R |
| 6,781,684 B1 * | 8/2004 | Ekhoff | ................. | B65G 49/061 356/237.1 |
| 7,222,846 B2 * | 5/2007 | Horiuchi | .................. | B65H 3/10 271/104 |
| 7,866,660 B2 * | 1/2011 | Ishida | .................... | B65H 9/002 271/171 |
| 9,027,919 B2 * | 5/2015 | Fukusaka | ............. | B41J 13/0009 271/111 |
| 9,148,939 B2 * | 9/2015 | Lee | ........................... | H05F 3/06 |
| 2010/0209163 A1 * | 8/2010 | Suzuki | ................... | B65H 3/128 399/397 |

(Continued)

FOREIGN PATENT DOCUMENTS

| | | |
|---|---|---|
| CN | 102730441 A | 10/2012 |
| JP | 2001-143722 A | 5/2001 |

(Continued)

*Primary Examiner* — Lynn E Schwenning
(74) *Attorney, Agent, or Firm* — Mintz Levin Cohn Ferris Glovsky and Popeo, P.C.; Peter F. Corless

(57) ABSTRACT

An apparatus of supplying a fuel cell stack material is provided. The apparatus includes a moving part in which a plurality of gas diffusion layers (GDLs) diffusing a gas fuel and supporting a catalyst layer are stacked and a cartridge having the moving part movably disposed therein. An adsorption pad is disposed above the cartridge to adsorb the plurality of gas diffusion layers and a nozzle part is configured to spray air above the plurality of gas diffusion layers to generate a lift on the plurality of gas diffusion layers.

9 Claims, 8 Drawing Sheets

(56) References Cited

U.S. PATENT DOCUMENTS

| | | | |
|---|---|---|---|
| 2014/0010627 A1* | 1/2014 | Li | B65H 3/0816 |
| | | | 414/797 |
| 2017/0092977 A1* | 3/2017 | Lee | H01M 8/2404 |
| 2018/0033697 A1* | 2/2018 | Suzuki | H01L 21/677 |

FOREIGN PATENT DOCUMENTS

| | | | | |
|---|---|---|---|---|
| JP | 2003-146461 | * | 5/2003 | B65H 3/48 |
| JP | 2003-146461 A | | 5/2003 | |
| JP | 2004-034552 A | | 2/2004 | |
| KR | 10-2009-0062955 A | | 6/2009 | |
| KR | 2009-0060869 A | | 6/2009 | |
| KR | 2009-0111898 A | | 10/2009 | |
| KR | 10-1427976 B1 | | 8/2014 | |

* cited by examiner

APPARATUS AND METHOD OF SUPPLYING FUEL CELL STACK MATERIAL

CROSS-REFERENCE TO RELATED APPLICATION

This application is based on and claims the benefit of priority to Korean Patent Application No. 10-2015-0173430, filed on Dec. 7, 2015 in the Korean Intellectual Property Office, the disclosure of which is incorporated herein in its entirety by reference.

TECHNICAL FIELD

The present disclosure relates to an apparatus of supplying a fuel cell stack material, and more particularly, to an apparatus and method of supplying a fixed quantity of fuel cell stack material.

BACKGROUND

Generally, a fuel cell stack indicates an electric energy generating apparatus in which unit cells are repeatedly stacked. The unit cell is a minimum fuel cell component for generating electric energy through a reaction between hydrogen and oxygen. The unit cell includes a separator, a gas diffusion layer (GDL), an electrode catalyst, and a proton exchange membrane sequentially stacked from the outermost portion thereof to the center thereof.

Particularly, the gas diffusion layer (GDL) uniformly diffuses a reaction gas supplied from the separator to a membrane-electrode assembly (MEA) 3-layer, and provides a function of effectively removing reaction product water and humidified water and an electric conduction function of electron movement between the separator and the MEA 3-layer. The MEA 3-layer, which generates electricity by generating a reaction of reaction gases (hydrogen and air) and moving hydrogen ions in a fuel cell, includes two electrode catalyst layers and a proton exchange membrane.

In addition, a combination of the MEA 3-layer and the gas diffusion layer (GDL) is referred to as an MEA 5-layer. To automatically manufacture the fuel cell stack as described above, the separator and the MEA 5-layer, which are components of the fuel cell stack, are automatically stacked using a Cartesian coordinate robot, an apparatus of assembling and supplying the fuel cell stack is prepared to allow execution of an air-tightness test of the fuel cell stack of which the stacking is completed.

SUMMARY

The present disclosure provides an apparatus of supplying a fuel cell stack material capable of reducing an error in which gas diffusion layers are lost or a plurality of gas diffusion layers are adsorbed based on materials of the gas diffusion layers when transferring the gas diffusion layers using a vacuum adsorption gripper. Aspects of the present disclosure are not limited to the above-mentioned aspects. That is, other aspects that are not mentioned may be obviously understood by those skilled in the art from the following specification.

According to an exemplary embodiment of the present disclosure, an apparatus of supplying a fuel cell stack material may include: a moving part in which a plurality of gas diffusion layers (GDLs) diffusing a gas fuel and supporting a catalyst layer may be stacked; a cartridge having the moving part movably disposed therein; an adsorption pad disposed above the cartridge to adsorb the plurality of gas diffusion layers; and a nozzle part configured to spray air above the plurality of gas diffusion layers to generate a lift on the plurality of gas diffusion layers.

The cartridge may include: a frame in which the moving part is installed; and a plurality of guide parts that extend from the frame in a direction in which the plurality of gas diffusion layers are stacked, and the nozzle part may be installed at one of the plurality of guide parts to spray the air in a length direction of the plurality of gas diffusion layers. The nozzle part may be disposed perpendicularly to the plurality of guide parts. The nozzle part may be disposed between an upper side of the plurality of gas diffusion layers and the adsorption pad. Additionally, the nozzle part may include: a bracket installed at the plurality of guide parts; and air supplying apertures formed at both sides of the bracket and spraying the air. The moving part may include: a support plate on which the plurality of gas diffusion layers may be stacked; and a servo motor connected to the support plate and configured to adjust the plurality of gas diffusion layers to maintain a constant distance from the nozzle part.

The apparatus of supplying a fuel cell stack material may further include position confirming sensor parts connected to the servo motor and configured to sense a position of the support plate. The apparatus of supplying a fuel cell stack material may further include a solenoid valve configured to adjust spraying pressure of the nozzle part based on a weight of the plurality of gas diffusion layers. The cartridge may include: a frame in which the moving part may be installed; and a plurality of guide parts that extend from the frame in a direction in which the plurality of gas diffusion layers are stacked, and the nozzle part may include: a first nozzle installed at one of the plurality of guide parts; and a second nozzle installed at a guide bar in a direction facing the first nozzle.

The first nozzle may include a first bracket in which first air supplying apertures spraying the air may be formed, and the first bracket may be installed at a second guide bar of the plurality of guide parts and may include the first air supplying apertures formed adjacently to the second guide bar. The first air supplying apertures may be formed in the plural in the first bracket, and may be formed at both sides of the second guide bar. The second nozzle may include a second bracket in which second air supplying apertures spraying the air may be formed, and the second bracket may be installed at a third guide bar facing the second guide bar and may be configured to spray the air toward the first air supplying apertures. The second air supplying apertures may be formed at both side ends of the second bracket to cause the air sprayed from the second air supplying apertures and the air sprayed from the first air supplying apertures to intersect with each other.

Detailed contents of other exemplary embodiments are described in a detailed description and are illustrated in the accompanying drawings.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
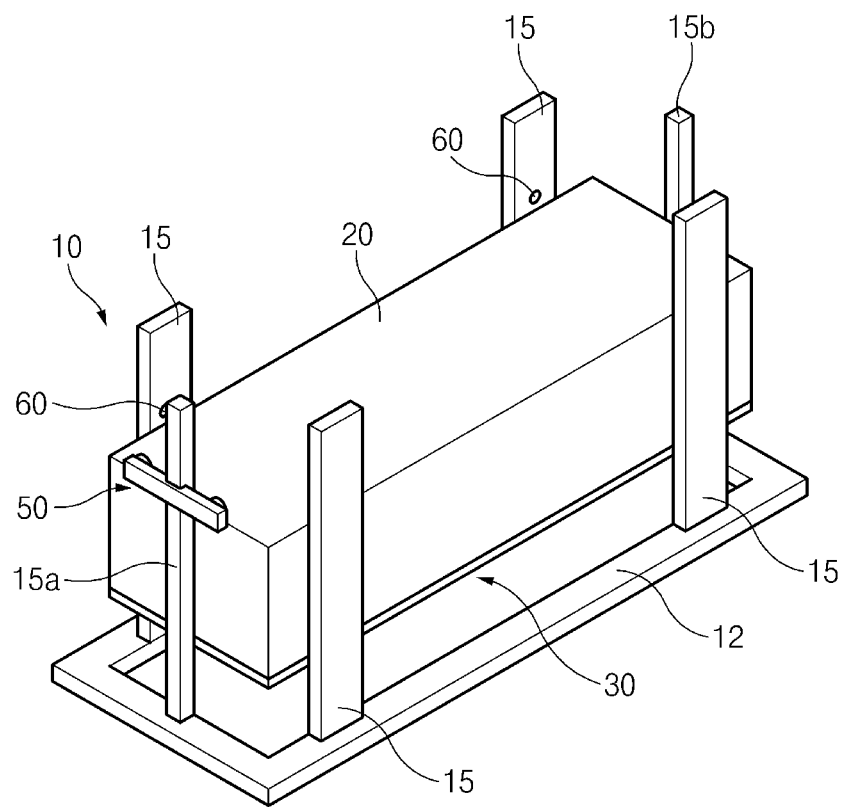
FIG. 1 is a perspective view illustrating an apparatus of supplying a fuel cell stack material according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Various advantages and features of the present disclosure and methods accomplishing them will become apparent from the following description of exemplary embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Throughout the specification, like reference numerals denote like elements.

Hereinafter, an apparatus of supplying a fuel cell stack material according to exemplary embodiments of the present disclosure will be described with reference to the accompanying drawings.

Figure 2A:
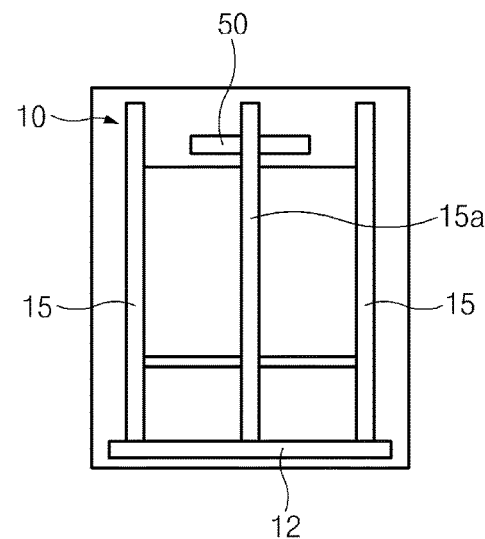
FIGS. 2A and 2B are, respectively, a front view and a side view illustrating the apparatus of supplying a fuel cell stack material of FIG. 1 according to an exemplary embodiment of the present disclosure.
Figure 2B:
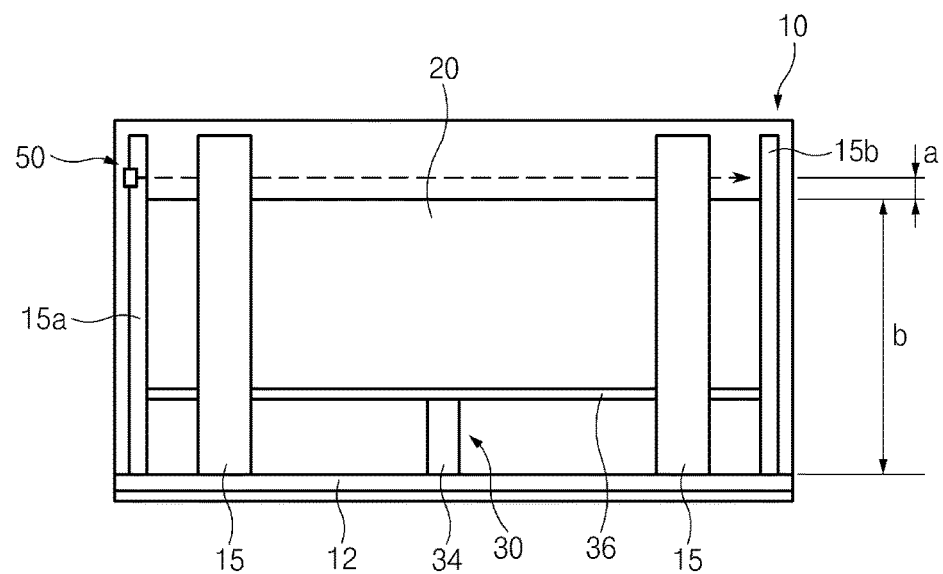
Figure 3:
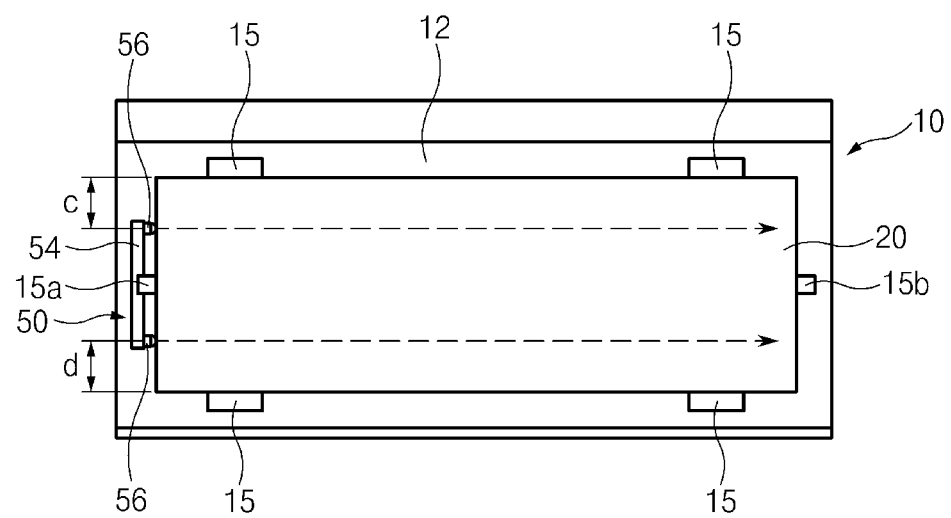
FIG. 3 is a plan view illustrating the apparatus of supplying a fuel cell stack material of FIG. 1 according to an exemplary embodiment of the present disclosure.
Figure 4:
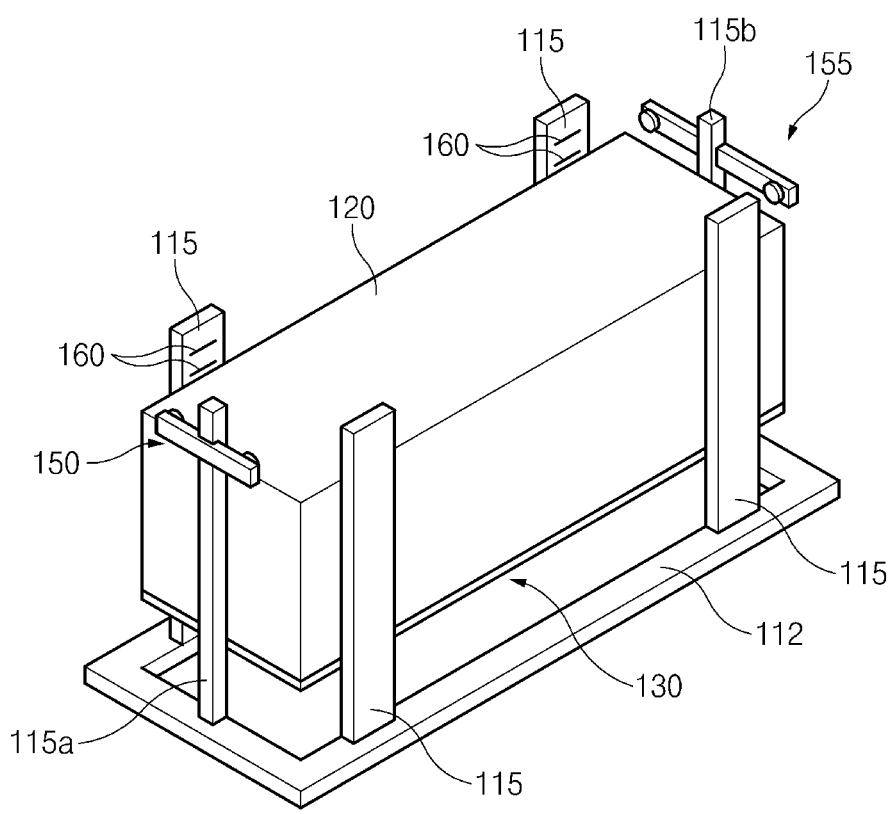
FIG. 4 is a perspective view illustrating an apparatus of supplying a fuel cell stack material according to another exemplary embodiment of the present disclosure.
Figure 5A:
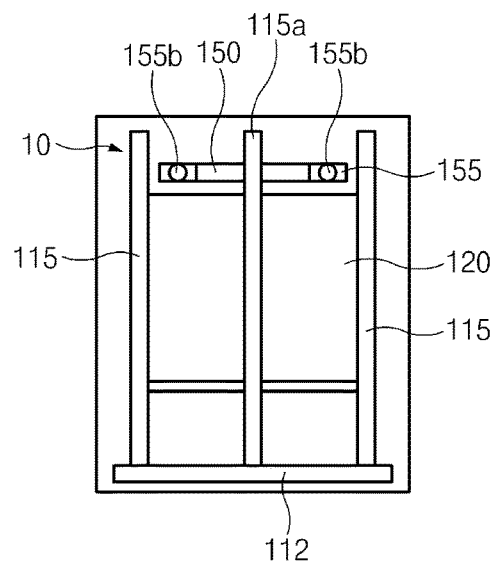
FIGS. 5A and 5B are, respectively, a front view and a side view illustrating the apparatus of supplying a fuel cell stack material of FIG. 4 according to an exemplary embodiment of the present disclosure.
Figure 5B:
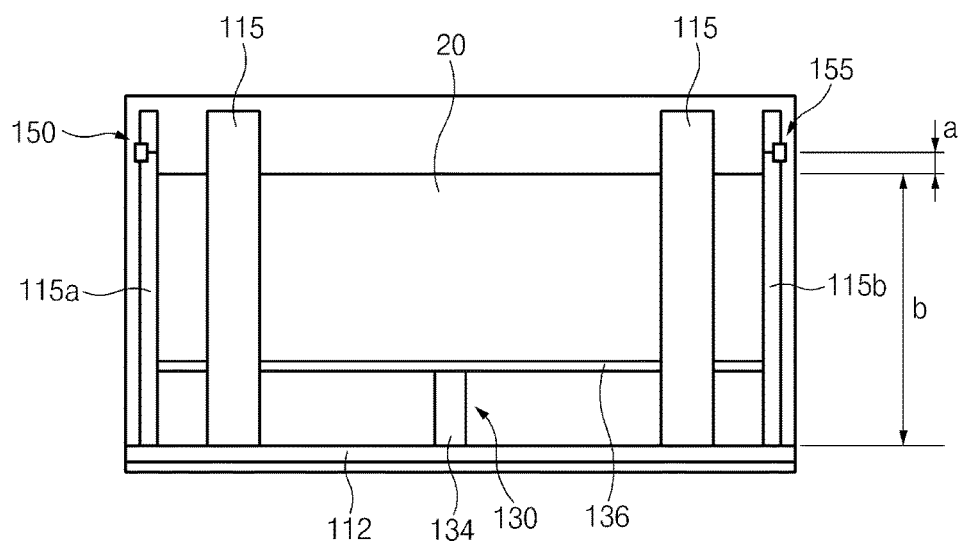
Figure 6:
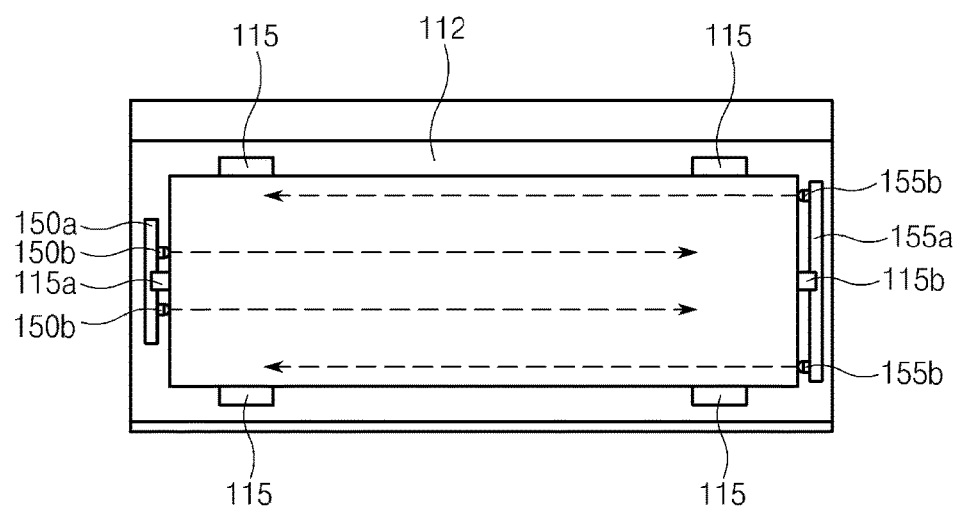
FIG. 6 is a plan view illustrating the apparatus of supplying a fuel cell stack material of FIG. 4 according to an exemplary embodiment of the present disclosure.
Figure 7:
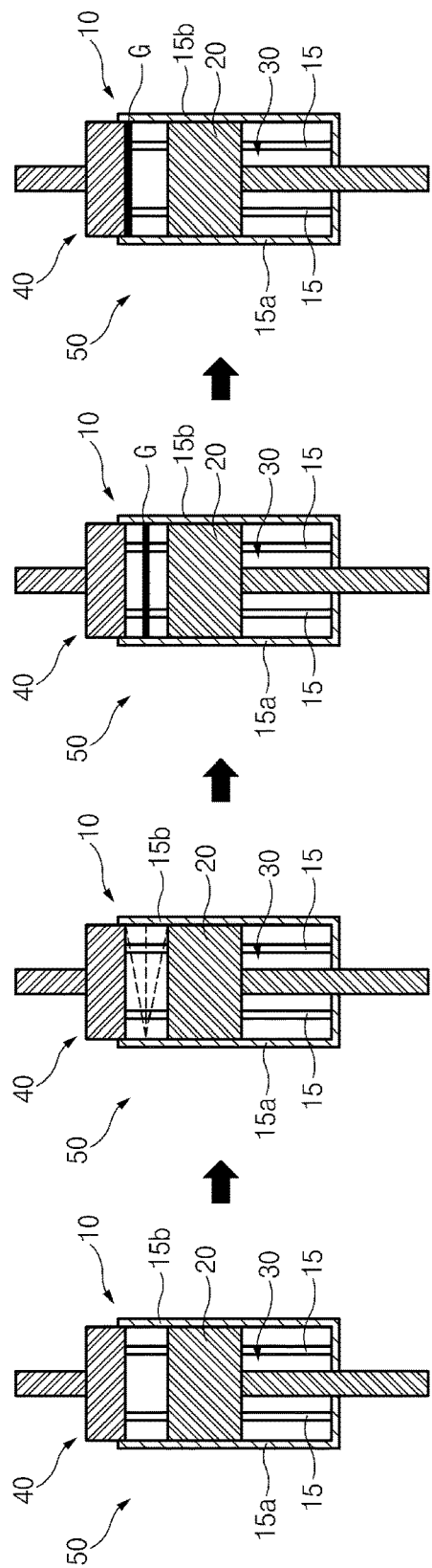
FIG. 7 is a view illustrating a process of supplying a fuel cell stack material by the apparatus of supplying a fuel cell stack material according to an exemplary embodiment of the present disclosure.
Figure 8:
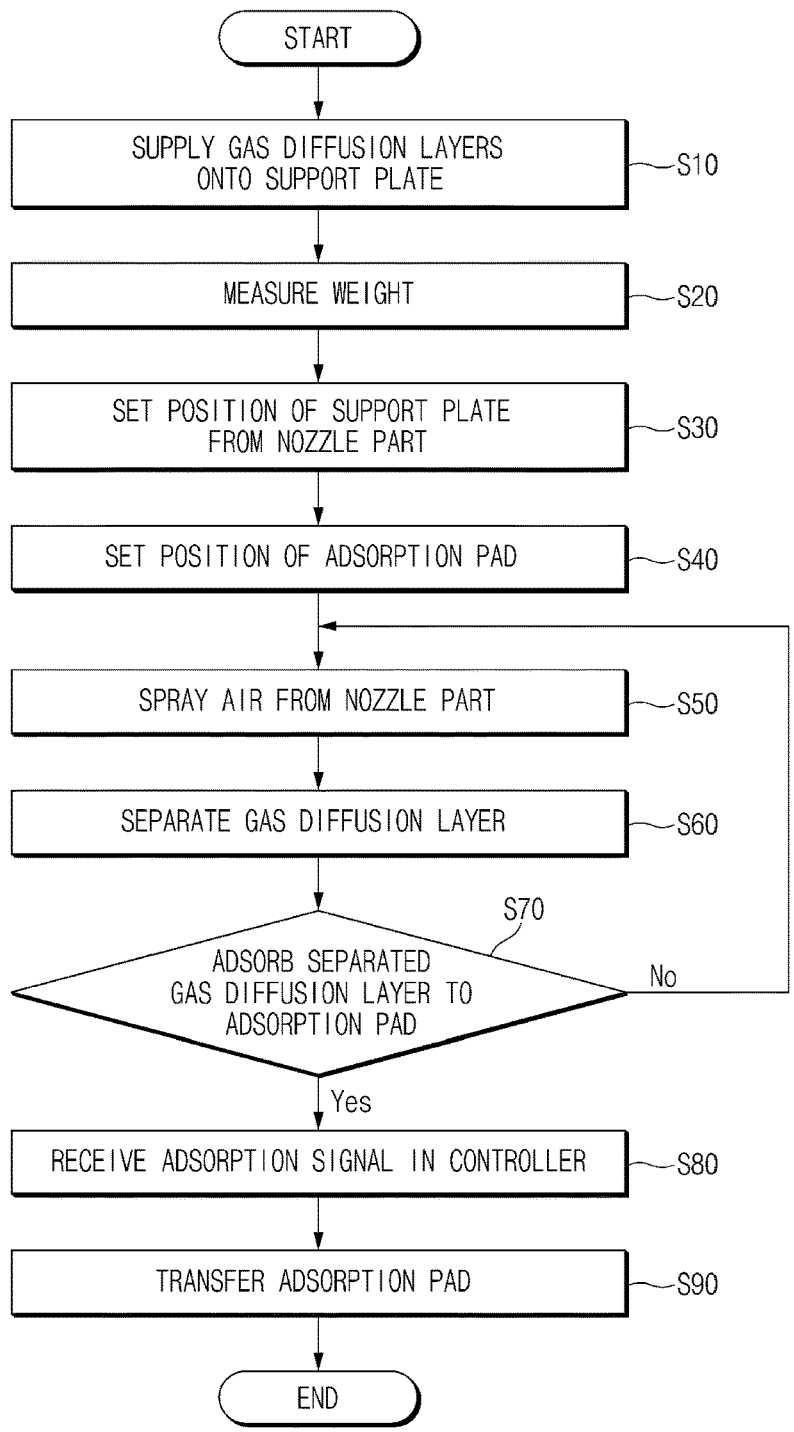
FIG. 8 is a flow chart illustrating a method of supplying a fuel cell stack material by the apparatus of supplying a fuel cell stack material according to an exemplary embodiment of the present disclosure.

FIG. 1 is a perspective view illustrating an apparatus of supplying a fuel cell stack material according to an exemplary embodiment of the present disclosure, FIGS. 2A and 2B are, respectively, a front view and a side view illustrating the apparatus of supplying a fuel cell stack material of FIG. 1, FIG. 3 is a plan view illustrating the apparatus of supplying a fuel cell stack material of FIG. 1, FIG. 4 is a perspective view illustrating an apparatus of supplying a fuel cell stack material according to another exemplary embodiment of the present disclosure, FIGS. 5A and 5B are, respectively, a front view and a side view illustrating the apparatus of supplying a fuel cell stack material of FIG. 4, FIG. 6 is a plan view illustrating the apparatus of supplying a fuel cell stack material of FIG. 4, FIG. 7 is a view illustrating a process of supplying a fuel cell stack material by the apparatus of supplying a fuel cell stack material according to the present disclosure, and FIG. 8 is a flow chart illustrating a method of supplying a fuel cell stack material by the apparatus of supplying a fuel cell stack material according to the present disclosure.

An apparatus of supplying a fuel cell stack material according to an exemplary embodiment may be modified by those skilled in the art, and the present exemplary embodiment relates to an apparatus of supplying a fuel cell stack material. FIG. 1 is a perspective view illustrating an apparatus of supplying a fuel cell stack material according to an exemplary embodiment of the present disclosure, FIGS. 2A and 2B are, respectively, a front view and a side view illustrating the apparatus of supplying a fuel cell stack material of FIG. 1, and FIG. 3 is a plan view illustrating the apparatus of supplying a fuel cell stack material of FIG. 1.

The apparatus of supplying a fuel cell stack material according to an exemplary embodiment of the present disclosure will described with reference to FIGS. 1 to 3. The apparatus of supplying a fuel cell stack material according to an exemplary embodiment of the present disclosure may include a moving part 30 in which a plurality of gas diffusion layers (GDLs) diffusing a gas fuel and supporting a catalyst layer may be stacked, a cartridge 10 having the moving part 30 movably disposed therein, an adsorption pad (40 in the FIG. 7) disposed above the cartridge 10 to adsorb the plurality of gas diffusion layers 20, a nozzle part 50 configured to spray air above the plurality of gas diffusion layers 20 to generate a lift on the plurality of gas diffusion layers 20, and position confirming sensor parts 60 connected to a servo motor 34 of the moving part 30 and configured to sense a position of a support plate 36.

The cartridge 10 may include the moving part 30 movably disposed therein. Further, the cartridge 10 may include a frame 12 in which the moving part 30 is installed, and a plurality of guide parts 15, 15a, and 15b that extend from the frame 12 in a direction in which the plurality of gas diffusion layers 20 are stacked. The nozzle part 50 may be installed at one of the plurality of guide parts 15, 15a, and 15b of the cartridge 10 to spray the air in a length direction of the plurality of gas diffusion layers 20. The plurality of guide parts 15, 15a, and 15b may be disposed to be spaced apart from each other to enclose the plurality of gas diffusion layers 20 and the moving part 30 extraneous to the plurality of gas diffusion layers 20 and the moving part 30 to vertically guide the plurality of gas diffusion layers 20 and the moving part 30.

The plurality of guide parts 15, 15a, and 15b may include first guide bars 15 formed to be spaced apart from each other in a long side direction (e.g., the length side) of a length direction of the moving part 30. Additionally, the plurality of guide parts 15, 15a, and 15b may include a second guide bar 15a formed in a short side direction (e.g., the breadth or width side; a side perpendicular to the length side direction) and disposed perpendicularly to the first guide bars 15. A third guide bar 15b may be disposed to face the second guide bar 15a. The nozzle part 50 may be installed at the second guide bar 15a and may be configured to spray air toward the third guide bar 15b. In particular, the plurality of gas diffusion layers 20 may not line-contact the plurality of guide parts 15, 15a, and 15b (e.g., may be spaced apart from) and may surface-contact the plurality of guide parts 15, 15a, and 15b due to brittle characteristics of a material of the gas diffusion layer 20.

The gas diffusion layer (GDL) 20 may be formed of a material having high air permeability, which is a porous material. More specifically, the gas diffusion layer 20 may be formed of porous carbon felt or porous carbon cloth. The plurality of gas diffusion layers 20 may be stacked on the support plate 36. The plurality of gas diffusion layers 20 may also be supported by the plurality of guide parts 15 to prevent separation thereof.

Furthermore, when the nozzle part 50 sprays the air at the uppermost side, a lift may be generated between an uppermost gas diffusion layer of the plurality of gas diffusion layers and a second uppermost gas diffusion layer of the plurality of gas diffusion layers may be influenced by gravity and thus, the uppermost gas diffusion layer and the second uppermost gas diffusion layer may be separated from each other. The apparatus of supplying a fuel cell stack material may further include a solenoid valve (not illustrated) configured to adjust a spraying pressure of the nozzle part 50 based on a weight of the plurality of gas diffusion layers 20. Therefore, the apparatus of supplying a fuel cell stack material according to the present disclosure may be applied based on a deviation between materials.

The moving part 30 may include the support plate 36 on which the plurality of gas diffusion layers 20 may be stacked, and the servo motor 34 connected to the support plate 36 and configured to move the support plate 36. Additionally, the moving part 30 may include the plurality of gas diffusion layers 20 stacked on the support plate 36 thereof and may be disposed in the cartridge 10. The moving part 30 may be moved or translated in a length direction of the plurality of guide parts 15, 15a, and 15b. The moving part 30 may further be configured to adjust the plurality of gas diffusion layers 20 to maintain a substantially constant distance from the nozzle part 50 by the servo motor 34. The moving part 30 may be configured to measure a weight of the plurality of gas diffusion layers 20 to maintain a substantially constant interval between the nozzle part 50 and the plurality of gas diffusion layers 20.

The position confirming sensor parts 60 may be installed at the moving part 30 to sense the uppermost part of the plurality of gas diffusion layers 20 based on a changed height of the plurality of gas diffusion layers 30. The position confirming sensor parts 60 may include upper position confirming sensors installed at upper ends of the first guide bars 15 and lower position confirming sensors installed to be spaced apart from the upper position confirming sensors by a substantially constant interval.

The upper position confirming sensor and the lower position confirming sensor may be formed in a pair at sensor axes installed at both sides of the support plate, and the sensor formed at the sensor axis installed at a first side may be configured to emit light to the sensor formed at the sensor axis installed at a second side to determine whether the gas diffusion layer is positioned between the sensors. Therefore, the support plate 36 may be moved vertically by an operation of the servo motor 34 connected to the position confirming sensor parts 60, to adjust a height of the gas diffusion layers stacked on the support plate 36 to a height appropriate for the gas diffusion layers to be adsorbed.

The adsorption pad (40 in the FIG. 7) may be disposed above the cartridge 10 to adsorb the plurality of gas diffusion layers 20. The adsorption pad 40 may be moved above the cartridge 10 by a robot arm (not illustrated), or the like. In addition, the adsorption pad 40 may be disposed above the cartridge 10 to be disposed above the plurality of gas diffusion layers 20 after a weight, or the like, of the plurality of gas diffusion layers 20 is measured. The adsorption pad 40 may be configured to adsorb gas diffusion layers separated by the air sprayed by the nozzle part 50.

The nozzle part 50 may be configured to spray the air above the plurality of gas diffusion layers 20 to generate the lift on the plurality of gas diffusion layers 20. The nozzle part 50 may be disposed perpendicularly to the plurality of guide parts 15, 15a, and 15b, and may be configured to spray the air above the plurality of gas diffusion layers 20. Further, the nozzle part 50 may be configured to spray the air in a long side direction to maximize the generation of the lift in the gas diffusion layers. Since a greater lift may be generated at a long side than at a short side by the air sprayed from the nozzle part 50, the air may be sprayed toward the long side. Particularly, the short side indicates a side of which a diameter distance is shorter, of two sides passing through the center of the gas diffusion layers, and the long side indicates a side of which a diameter distance is greater, of the two sides passing through the center of the gas diffusion layers.

Additionally, the nozzle part 50 may be disposed between an upper side of the plurality of gas diffusion layers 20 and the adsorption pad (40 in the FIG. 7). The nozzle part 50 may include a bracket 54 installed at the plurality of guide parts 15, 15a, and 15b and air supplying apertures 56 formed at both sides of the bracket 54 and configured to spray the air. In particular, the nozzle part 50 may be installed at the short side of the gas diffusion layers to be positioned at a height b higher than a position of the uppermost end of the gas diffusion layers by about 2 mm or more to about 15 mm or less.

When the nozzle part 50 is positioned at a height higher than the position of the uppermost end of the gas diffusion layers by about 2 mm or less, a drag as well as the lift may be strongly generated, and thus, a problem that the gas diffusion layers are pushed in an air spraying direction occurs. In addition, when the nozzle part 50 is positioned at a height higher than the position of the uppermost end of the gas diffusion layers by about 15 mm or more, generation of the lift may be weakened, and thus the lift is not generated in the uppermost gas diffusion layer.

An apparatus of supplying a fuel cell stack material according to another exemplary embodiment of the present disclosure will be described with reference to FIGS. 4 to 6. When gas diffusion layers rise by a lift generated by a flow velocity generated by air sprayed from a nozzle part 150, a drag may be generated together with the lift, and thus the gas diffusion layers may be pushed in an air spraying direction based on rigidity of a material. To prevent a phenomenon that the gas diffusion layers are pushed, air may also be positioned in an opposite direction, to offset the generated drag. During the manufacturing of the apparatus for supplying a fuel cell stack material in this shape, the lift may be doubled.

In other words, a cartridge 110 may include a frame 112 in which a moving part 130 may be installed, and a plurality of guide parts 115, 115a, and 115b that extend from the frame 112 in a direction in which a plurality of gas diffusion layers 120 are stacked, and the nozzle part 150 and 155 may include a first nozzle 150 installed at one of the plurality of guide parts 115, 115a, and 115b, and a second nozzle 155 installed at a guide bar in a direction facing the first nozzle 150.

The first nozzle 150 and the second nozzle 155 may be disposed so that interference therebetween is not generated. The first nozzle 150 and the second nozzle 155 may be disposed so that an interval between air sprayed from the first nozzle 150 and air sprayed from the second nozzle 155 is substantially constant to balance a lift. The nozzle of one side may be installed to face a central portion of the gas diffusion layers. Further, the first nozzle 150 may include a first bracket 150a in which first air supplying apertures 150b configured to spray the air may be formed. The first bracket 150a may be installed at a second guide bar 115a of the plurality of guide parts 115, 115a, and 115b, and the first air supplying apertures 150b may be formed adjacently to the second guide bar 115b. The first air supplying apertures 150b may be formed in the plural in the first bracket 150a at both sides of the second guide bar 115a.

Additionally, the second nozzle 155 may include a second bracket 155a in which second air supplying apertures 155b configured to spray the air may be formed. The second bracket 155a may be installed at a third guide bar 115b facing the second guide bar 115a to spray the air toward the first air supplying apertures 150b. The second air supplying apertures 155b may be formed at both side ends of the second bracket 155a to cause air sprayed from the second air supplying apertures 155b and the air sprayed from the first air supplying apertures 150b to intersect with and prevent interference with each other. Therefore, a distance by which the second air supplying apertures 155b are spaced apart from each other may be greater or less than a distance by which the first air supplying apertures 150b are spaced apart from each other, to prevent interference between the air sprayed from the first air supplying apertures 150b and the air sprayed from the second air supplying apertures 155b.

In addition, the first air supplying apertures 150b and the second air supplying apertures 155b may be disposed to be spaced apart from each other by substantially constant intervals to reduce generation of the drag. The air sprayed from the first air supplying apertures 150b and the air sprayed from the second air supplying apertures 155b may be sprayed in directions facing each other to reduce the drag pushing the gas diffusion layers. Further, position confirming sensor parts 160 may be installed at the moving part 130 to sense the uppermost part of the plurality of gas diffusion layers 120 based on an adjusted height of the moving part 130. The position confirming sensor parts 160 may include upper position confirming sensors installed at upper ends of the first guide bars 115 and lower position confirming sensors installed to be spaced apart from the upper position confirming sensors by a constant interval.

The upper position confirming sensor and the lower position confirming sensor may be formed in a pair at sensor axes installed at both sides of the support plate, and the sensor formed at the sensor axis installed at a first side may be configured to emit light to the sensor formed at the sensor axis installed at a second side to determine whether the gas diffusion layer is positioned between the sensors. Therefore, the support plate 136 may be moved vertically by an operation of the servo motor 134 connected to the position confirming sensor parts 160, to adjust a height of the gas diffusion layers stacked on the support plate 136 to a height appropriate for the gas diffusion layers to be adsorbed.

An operation of the apparatus of supplying a fuel cell stack material according to an exemplary embodiment of the present disclosure configured as described above will be described. An operation of the apparatus of supplying a fuel cell stack material according to an exemplary embodiment of the present disclosure will be described with reference to FIGS. 7 and 8.

The plurality of gas diffusion layers (GDLs) 20 may be stacked in the cartridge including the moving part 30 vertically slid (S10). A weight of the plurality of gas diffusion layers may be measured to adjust a height of the moving part (S20). The moving part 30 may be adjusted to maintain a substantially constant interval between the nozzle part 50 spraying the air and the upper side of the plurality of gas diffusion layers 20 (S30). In particular, the moving part 30 may be moved in a vertical direction along the plurality of guide parts 15, 15a, and 15b. After the height of the moving part 30 is set, the adsorption pad 40 configured to adsorb the plurality of gas diffusion layers 20 may be moved above the plurality of gas diffusion layers 20 (S40). After the adsorption pad 40 is moved, the air may be sprayed in the length direction of the plurality of gas diffusion layers 20 above the plurality of gas diffusion layers 20 (S50).

The air may be sprayed above the plurality of gas diffusion layers 20, and thus, the lift may be generated between the gas diffusion layer positioned at the uppermost end among the plurality of gas diffusion layers 20 and the next gas diffusion layer by the flow velocity of the air to separate the gas diffusion layer positioned at the uppermost end from the next gas diffusion layer (S60). The separated gas diffusion layer G may be adsorbed to the adsorption pad 40 (S70). When the gas diffusion layer G is adsorbed to the adsorption pad 40, a controller (not illustrated) may be configured to receive an adsorption signal of the gas diffusion layer G (S80). When the gas diffusion layer is not adsorbed to the adsorption pad 40, a process may return to the next step of a step (S40) to again spray the air.

Further, the controller may be configured to transfer the adsorption pad 40 (S90). The process may return to a step (S20) of measuring a weight of the plurality of gas diffusion layers to measure the weight of the plurality of gas diffusion layers 20. Particularly, in a process of adjusting the height of the moving part 30, pressure of the air sprayed from the nozzle part 50 may be adjusted based on an interval between the nozzle part 50 and the upper side of the plurality of gas diffusion layers 20. In addition, a solenoid valve (not illustrated) may be connected to the nozzle part 50 and thus, the lift may be generated on the plurality of gas diffusion layers 20 based on the weight of the plurality of gas diffusion layers 20, thereby making it possible to adjust the pressure of the air.

In the apparatus of supplying a fuel cell stack material according to an exemplary embodiment of the present disclosure, the configuration and the method of the exemplary embodiments as described above are not restrictively applied. Rather, all or some of the exemplary embodiments may be selectively combined with each other so that the exemplary embodiments may be variously modified.

As described above, according to the exemplary embodiment of the present disclosure, the apparatus of supplying a fuel cell stack material has the following one or more effects.

First, in the apparatus of supplying a fuel cell stack material according to an exemplary embodiment of the present disclosure, a position of the gas diffusion layers may be adjusted to supply some separated gas diffusion layers of the plurality of gas diffusion layers to the adsorption pad, thereby making it possible to reduce a defective rate occurring due to separation of the plurality of gas diffusion layers.

Second, in the apparatus of supplying a fuel cell stack material according to an exemplary embodiment of the present disclosure, a separated material of materials of the plurality of gas diffusion layers, stacked membrane-electrode assemblies (MEAs), or the like, may be adsorbed to the adsorption pad, to reduce a defective rate and a delay time based on occurrence of a defect, thereby making it possible to improve a production rate.

Third, in the apparatus of supplying a fuel cell stack material according to an exemplary embodiment of the present disclosure, the pressure of the sprayed air may be adjusted based on materials of the plurality of gas diffusion layers, MEAs, or the like, thereby making it possible to perform separation based on a deviation between the materials.

The effects of the present disclosure are not limited to the above-mentioned effects. That is, other effects that are not mentioned may be obviously understood by those skilled in the art from the claims. Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus of supplying a fuel cell stack material, comprising:
    a moving part in which a plurality of gas diffusion layers (GDLs) are stacked, the plurality of gas diffusion layers diffusing a gas fuel and supporting a catalyst layer;
    a cartridge having the moving part movably disposed therein;
    an adsorption pad disposed above the cartridge; and
    a nozzle part disposed between an upper side of the plurality of gas diffusion layers and the adsorption pad;
    wherein the nozzle part is configured to spray air above the plurality of gas diffusion layers to generate a lift force such that a gas diffusion layer stacked on top of the plurality of gas diffusion layers is separated from the remaining gas diffusion layers of the plurality of gas diffusion layers,
    wherein the adsorption pad is configured to adsorb the separated gas diffusion layer,
    wherein the nozzle part includes:
        a first nozzle including first air supplying apertures configured to spray air in a first direction; and
        a second nozzle facing the first nozzle and including second air supplying apertures configured to spray air in a second direction opposite of the first direction, and
    wherein the first air supplying apertures are positioned out of line with the second air supplying apertures in order to prevent interference between the air sprayed from the first air supplying apertures and the air sprayed from the second air supplying apertures.

2. The apparatus of supplying a fuel cell stack material according to claim 1, wherein the cartridge includes:
    a frame in which the moving part is installed; and
    a plurality of guide parts that extend from the frame in a direction in which the plurality of gas diffusion layers are stacked.

3. The apparatus of supplying a fuel cell stack material according to claim 2, wherein:
    the plurality of guide parts include a plurality of guide bars that are disposed opposite of each other, and
    wherein the first nozzle is installed on a first guide bar, and
    the second nozzle is installed on a second guide bar.

4. The apparatus of supplying a fuel cell stack material according to claim 3, wherein the first nozzle includes a first bracket in which the first air supplying apertures are formed, and the first bracket is installed at the first guide bar, and includes the first air supplying apertures formed adjacently to the first guide bar.

5. The apparatus of supplying a fuel cell stack material according to claim 4, wherein the first air supplying apertures are formed in the plural in the first bracket, and are formed at both sides of the first guide bar.

6. The apparatus of supplying a fuel cell stack material according to claim 5, wherein the second air supplying apertures are formed at both side ends of the second bracket to cause the air sprayed from the second air supplying apertures to be parallel with the air sprayed from the first air supplying apertures.

7. The apparatus of supplying a fuel cell stack material according to claim 4, wherein the second nozzle includes a second bracket in which the second air supplying apertures are formed, and the second bracket is installed at the second guide bar facing the first guide bar and is configured to spray the air toward the first air supplying apertures.

8. The apparatus of supplying a fuel cell stack material according to claim 1, wherein the moving part includes:
    a support plate on which the plurality of gas diffusion layers are stacked; and
    a servo motor connected to the support plate and configured to adjust the plurality of gas diffusion layers to maintain a constant distance from the nozzle part.

9. The apparatus of supplying a fuel cell stack material according to claim 8, further comprising:
    position confirming sensor parts connected to the servo motor and configured to sense a position of the support plate.

* * * * *